//
US008042952B2

(12) United States Patent
Tanaka et al.

(10) Patent No.: US 8,042,952 B2
(45) Date of Patent: Oct. 25, 2011

(54) CONTROL OF A LIGHT VALVE THAT IS DEPENDENT UPON A VOLTAGE AND A DURATION TIME OF LIGHTING MEASUREMENT OF A LIGHT SOURCE UNIT

(75) Inventors: Atsushi Tanaka, Fuchu (JP); Hiroshi Nishikawa, Kawasaki (JP); Naoki Kojima, Kawasaka (JP)

(73) Assignee: Canon Kabushiki Kaisha, Tokyo (JP)

(*) Notice: Subject to any disclaimer, the term of this patent is extended or adjusted under 35 U.S.C. 154(b) by 976 days.

(21) Appl. No.: 11/737,860

(22) Filed: Apr. 20, 2007

(65) Prior Publication Data

US 2008/0052022 A1 Feb. 28, 2008

(30) Foreign Application Priority Data

Apr. 21, 2006 (JP) ................. 2006-118443

(51) Int. Cl.
*G03B 21/20* (2006.01)
*G01J 1/32* (2006.01)
(52) U.S. Cl. .......................... 353/85; 250/205
(58) Field of Classification Search .......... 353/7, 85–87, 353/122, 31–37; 315/30, 307, 149–159; 313/461, 464, 465; 250/201.1, 205, 550, 250/552, 553, 206, 208.1; 340/635, 636.11–636.15, 340/657, 660–664; 345/214, 3.1–3.4, 48–54, 345/84, 85, 87; 349/33, 34, 199, 201, 202; 362/97.2, 97.3, 249.03, 249.07, 235
See application file for complete search history.

(56) References Cited

U.S. PATENT DOCUMENTS

| 4,964,719 A * | 10/1990 | Tachikawa et al. ............. 353/85 |
| 6,467,911 B1 * | 10/2002 | Ueyama et al. ................. 353/87 |
| 6,634,757 B2 * | 10/2003 | Asakawa ........................ 353/85 |
| 7,372,883 B2 * | 5/2008 | Pruett ........................ 372/38.07 |
| 2003/0179346 A1 * | 9/2003 | Mihara ........................... 353/31 |

FOREIGN PATENT DOCUMENTS

| JP | 05-173107 | | 7/1993 |
| JP | 05-232428 | | 9/1993 |
| JP | 08-149494 | | 6/1996 |
| JP | 2000105545 A | * | 4/2000 |
| JP | 2001-337392 A | | 12/2001 |
| JP | 2004-234924 A | | 8/2004 |
| JP | 2004-296841 A | | 10/2004 |
| JP | 2005-227577 A | | 8/2005 |

* cited by examiner

*Primary Examiner* — Que T Le
*Assistant Examiner* — Jennifer Bennett
(74) *Attorney, Agent, or Firm* — Canon U.S.A., Inc., IP Division

(57) ABSTRACT

In order to provide a high-image-quality display apparatus which can perform proper correction with respect to an abrupt luminance change at the time of lighting of a discharge lamp and a white balance change, a projection type display apparatus which projects irradiating light from a light source unit to a screen through a light valve includes a measurement unit which measures at least one of a voltage value and a current value supplied to the light source unit, and a control unit which controls the light valve based on a measurement result obtained by the measurement unit.

8 Claims, 11 Drawing Sheets

CONTROL OF A LIGHT VALVE THAT IS DEPENDENT UPON A VOLTAGE AND A DURATION TIME OF LIGHTING MEASUREMENT OF A LIGHT SOURCE UNIT

BACKGROUND OF THE INVENTION

1. Field of the Invention

The present invention relates to a display control technique for a projection type display apparatus.

2. Description of the Related Art

A variety of high-quality video sources including video sources such as high-definition television (HDTV) broadcasting are available. In addition, presentations and the like in meeting rooms are generally conducted with videos on computers. For this reason, increasing demands have arisen for improvement in the image quality of video apparatuses and increases in the screen sizes of the apparatuses used for such purposes. A rear-projection type display apparatus is available as a promising technique of implementing such a high-quality, large-screen display apparatus.

An apparatus designed to project videos by using a high-luminance CRT (Cathode-Ray Tube) has initially been the mainstream of rear-projection type video apparatuses. Recently, however, a rear-projection type video apparatus using a light valve such as a transmissive liquid crystal, a reflective liquid crystal or a digital micro-mirror device (DMD) has become the mainstream. Such an apparatus is designed to apply light to the light valve and enlarge/project video light from an image surface of the light valve onto the screen by using the projection optical system. Many such apparatuses use, as light valves, LCOS (Liquid Crystal On Silicon) panels having characteristics that inter-pixel joints are inconspicuous and the optical control efficiency is high. Note that an LCOS panel is a reflective liquid crystal panel obtained by forming a liquid crystal layer on a semiconductor substrate. This apparatus uses, as a light source, a discharge lamp such as a superhigh-pressure mercury lamp or a metal halide lamp owing to its high luminous efficacy.

Note that a projector designed to project video light from the front surface of the screen is called a front projector, and a projector designed to project video light from the rear surface of the screen is called a rear projector. In this case, the "front surface" indicates the side where the observer is located, and the "rear surface" indicates the side opposite thereto.

Various kinds of discharge lamps used in these projection type display apparatuses have the following characteristics. A change in the temperature of a discharge lamp affects the state of mercury or the like in the lamp, resulting in a change in internal pressure. This will cause changes in luminance and white balance. In order to solve this problem, for example, Japanese Patent No. 3299058 discloses an arrangement which corrects a color temperature change caused by a rise in the temperature of a metal halide lamp in long-term continuous use, on the basis of the temperature detected by a temperature detection means provided near the lamp. In addition, Japanese Patent Laid-Open No. 05-173107 discloses a technique of measuring the time of lighting of a lamp and correcting white balance in accordance with the time of lighting. Furthermore, Japanese Patent Laid-Open No. 05-232428 discloses a technique of directly detecting the balance between the respective colors, R, G, and B, by providing a light-receiving unit which receives illumination light, and detecting the variation amount of an emission spectrum distribution. This reference discloses an arrangement which corrects a temporal change in the color reproducibility of a video upon a change in emission spectrum distribution based on a total emission time.

Figure 10:
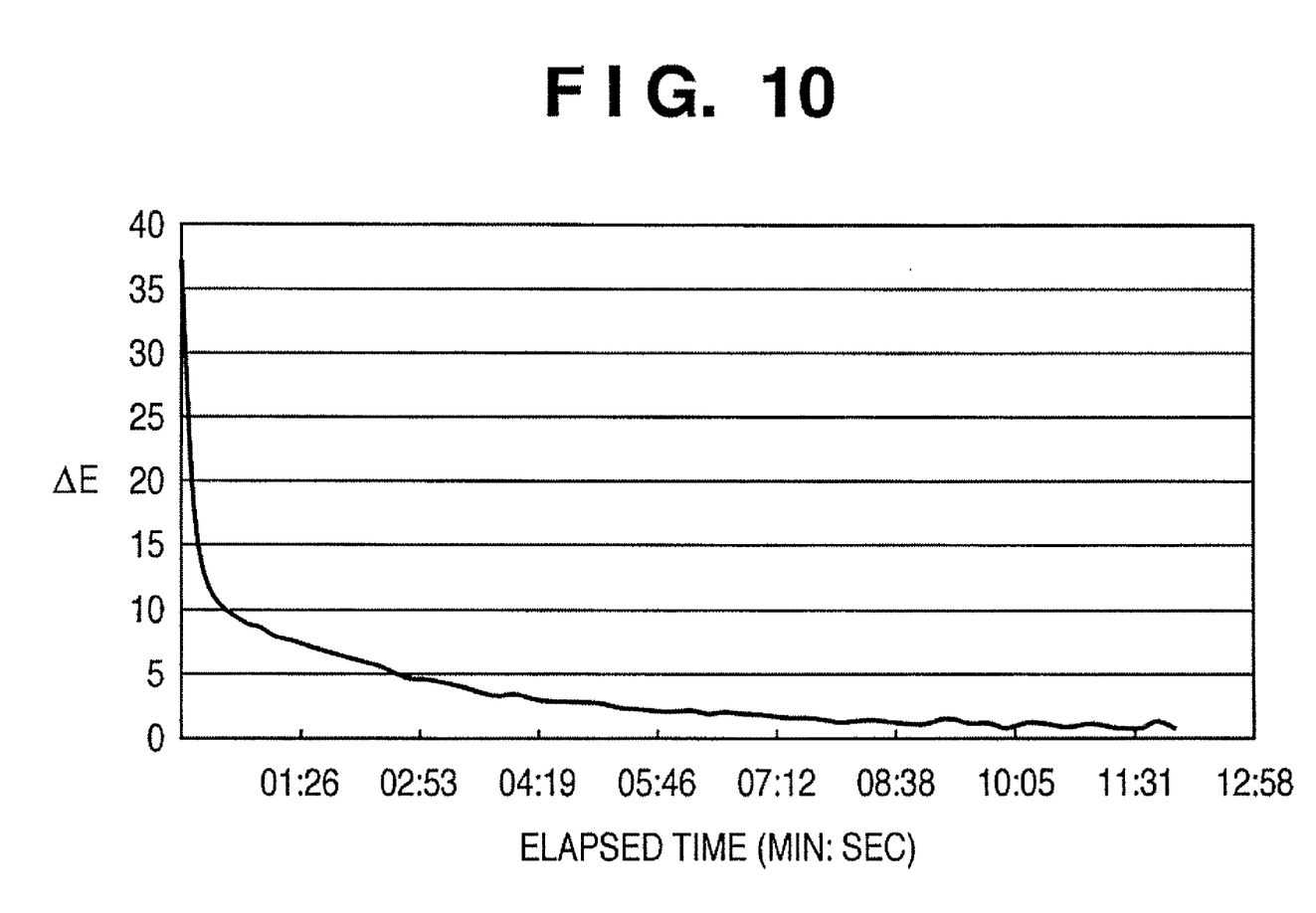
FIG. 10 is a graph based on actual measurement and showing a temporal change in color difference ΔE at the start of lighting of the discharge lamp.
Figure 11:
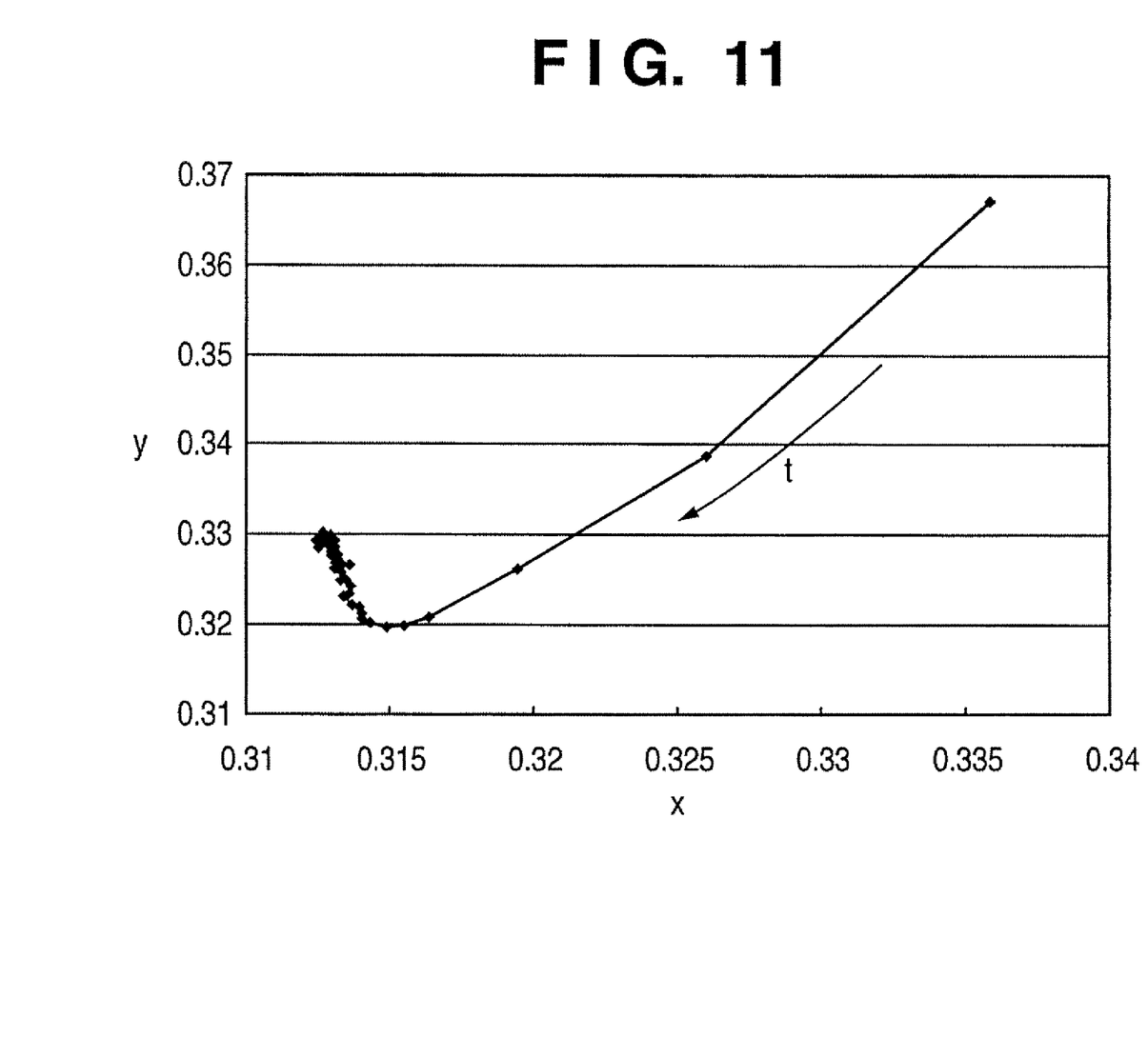
FIG. 11 is a graph based on actual measurement and showing a change in the position of a white spot on an x-y plane in a Yxy coordinate system.

Particularly from the start of lighting until a predetermined period of time has elapsed, the rate of change in the amount of mercury vapor inside is very high. Therefore, variations in the color of the discharge lamp are very large. FIG. 10 is a graph based on an actual measurement showing a temporal change in color difference ΔE at the start of lighting of the discharge lamp. Referring to FIG. 10, the color difference ΔE from illumination light at a rise time is plotted along the elapsed time with reference to a white spot of illumination light in a long-term continuous state (stable state). As is obvious from FIG. 10, the color difference ΔE changes greatly in a period of several minutes from the start of lighting, and the rate of change is high. Referring to FIG. 11, a change in the position of a white spot on an x-y plane in a Yxy coordinate system is plotted along the elapsed time. Obviously, the position of a white spot greatly changes along with an elapsed time t in the direction indicated by the arrow on the x-y plane. That is, it is obvious that the white balance greatly changes within the measurement period in FIG. 11.

The measurement speed of conventional temperature measurement near a lamp is too low to follow such a short-term change (fast change), resulting in an incapability of properly correcting the change. In addition, performing only time measurement leads to a high possibility of occurrence of errors in correction values due to the influences of variations in lamp bodies, ambient temperature, and the like. Furthermore, installing a color measurement sensor capable of handling fast color changes will cause an increase in cost and limit the degree of freedom in terms of the internal arrangement of the apparatus.

SUMMARY OF THE INVENTION

The present invention has been made in consideration of the above problems, and has as its object to provide a high-image-quality display apparatus which can perform proper correction with respect to an abrupt luminance change at the time of lighting of a lamp, a white balance change, and the like.

In order to achieve the above object, a projection type display apparatus of the present invention has the following arrangement.

A projection type display apparatus which projects irradiating light from a light source unit to a screen through a light valve, comprising: a measurement unit adapted to measure at least one of a voltage value and a current value supplied to the light source unit; and a control unit adapted to control the light valve on the basis of a measurement result obtained by the measurement unit.

In order to achieve the above object, a control method for a projection type display apparatus of the present invention has the following arrangement.

A control method for a projection type display apparatus which projects irradiating light from a light source unit to a screen through a light valve, comprising: a measurement step of measuring at least one of a voltage value and a current value supplied to the light source unit; and a control step of controlling the light valve on the basis of a measurement result obtained in the measurement step.

The present invention can provide a high-image-quality display apparatus which can perform proper correction with respect to an abrupt luminance change at the time of lighting of a lamp, a white balance change, and the like.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

A preferred embodiment of the present invention will be exemplarily described with reference to the accompanying drawings. Note, however, that the constituent elements described in this embodiment are merely examples, and the scope of the present invention is not limited only to them.

First Embodiment

A rear-projection type display apparatus using LCOS panels will be described as the first embodiment of the projection type display apparatus according to the present invention.

<Structure of Rear-Projection Type Display Apparatus>

Figure 1:
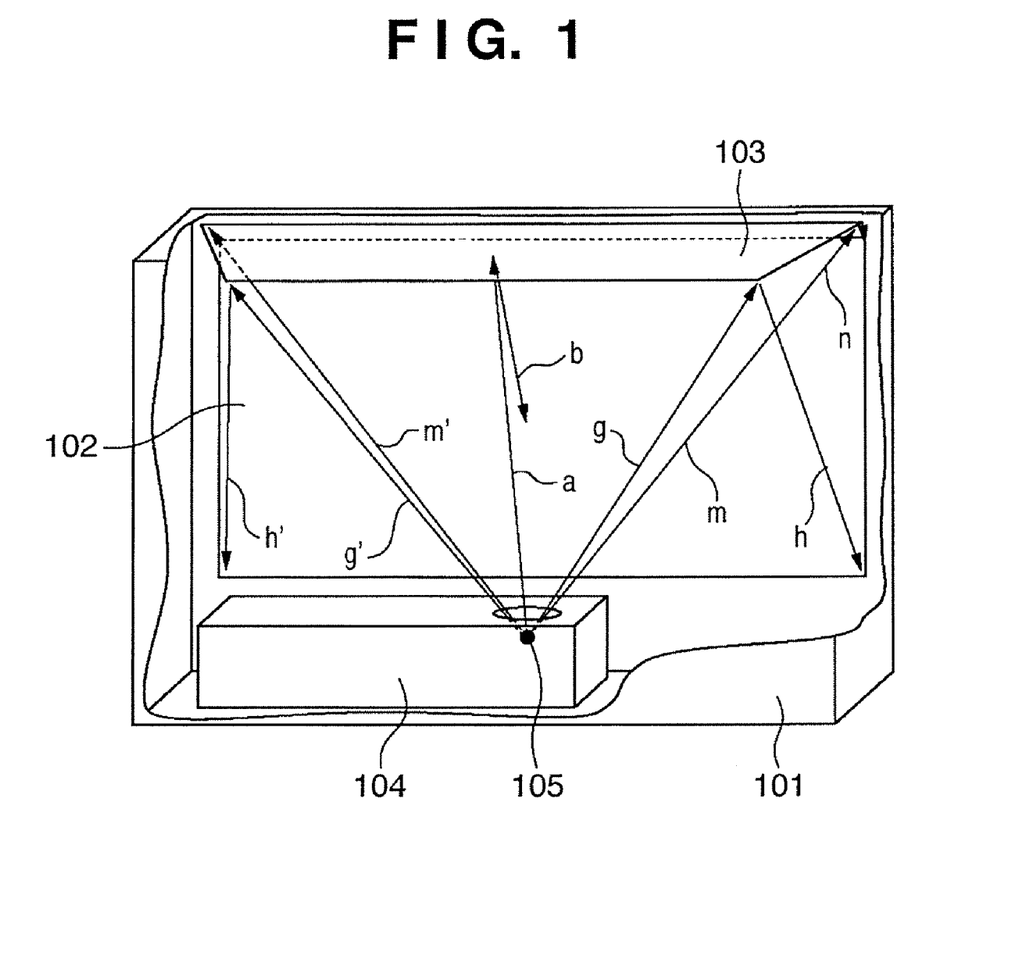
FIG. 1 is a view showing the schematic structure of a rear-projection type display apparatus when viewed from the back of the projection surface.

FIG. 1 is a view showing the schematic structure of the rear-projection type display apparatus viewed from the back of the projection surface. That is, FIG. 1 shows the arrangement of the apparatus viewed from its inside.

In a housing 101 of the rear-projection type display apparatus, an optical system comprises a projection unit 104, a total reflection fresnel screen 102 (to be simply referred to as the screen 102 hereinafter), and a ceiling mirror 103.

The ceiling mirror 103 reflects a light beam a projected from the projection unit 104, and projects the light beam as a light beam b onto the screen 102. The ceiling mirror 103 also reflects light beams corresponding to the four corners of the screen 102 to project them onto the screen 102. Light projected onto the screen 102 emerges in the direction toward the user owing to total reflection inside a prism comprising the screen 102 surface, as will be described later.

Figure 2:
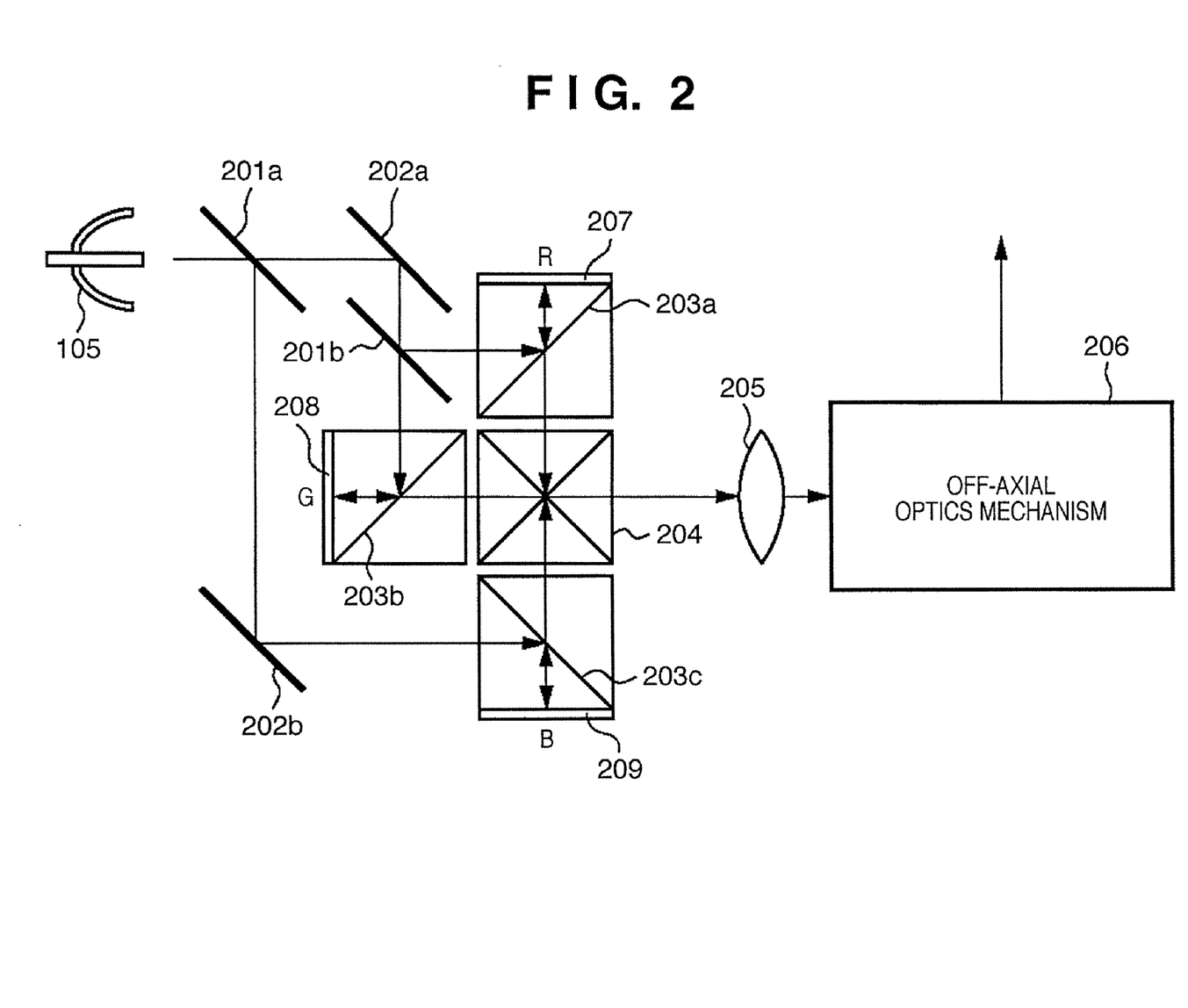
FIG. 2 is a view showing the schematic arrangement of the interior of a projection unit.

FIG. 2 is a view showing the schematic arrangement of the interior of the projection unit.

The projection unit 104 comprises a discharge lamp 105 as a light source. The projection unit 104 also comprises a dichroic mirror 201, mirror 202, PBS (polarizing beam splitter) 203, LCOS panels 207 to 209, cross dichroic prism 204, and lens 205. This optical system comprises an off-axial optics mechanism 206.

Many projection type display apparatuses use a discharge lamp 105 such as a superhigh-pressure mercury lamp or a metal halide lamp as a light source owing to its high efficiency, short arc, and the like. Applying a voltage to the discharge lamp 105 produces light with high-luminance using mercury vapor or the like.

The dichroic mirror 201 separates light from the discharge lamp 105 into light beams of R, G, and B. Referring to FIG. 2, a mirror 201a separates light into a light beam of R+G and a light beam of B, and a mirror 201b separates the light into a light beam of R and a light beam of G. The separated light beams of R, G, and B respectively strike the LCOS panels 207, 208, and 209 through the PBS (polarizing beam splitter) 203.

The LCOS panels 207 to 209 are driven in accordance with video signals of R, G, and B. Reflected light beams corresponding to the video signals pass through the PBS 203 again and strike the cross dichroic prism 204. The cross dichroic prism 204 combines the light beams (videos) of R, G, and B which have struck the cross dichroic prism 204. The combined light emerges toward the ceiling mirror 103 through the lens 205 and the off-axial optics mechanism 206. In this case, using the off-axial optics mechanism 206 with an offset axis makes it possible to decrease the thickness of the apparatus when the off-axial optics mechanism 206 is combined with the screen 102 described above, while reducing the luminance difference between the central portion and the peripheral portion on the screen 102.

Figure 3:
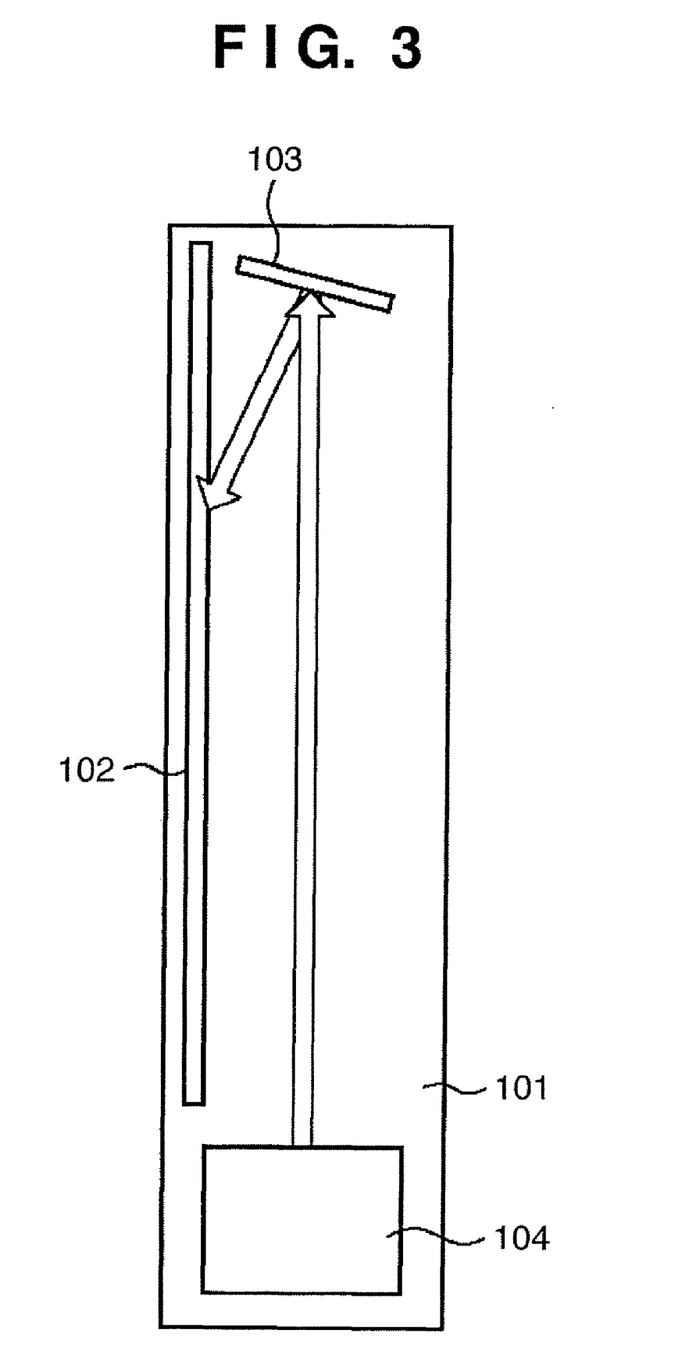
FIG. 3 is a view schematically showing how video light is projected on a screen.

FIG. 3 is a view schematically showing how a light beam from the projecting unit 104 is reflected by the ceiling mirror and video light is projected onto the screen 102. The outlined arrows in FIG. 3 indicate the optical path of video light projected onto the screen 102. As will be described later, most of this video light travels toward the front surface of the screen 102 (the left on the drawing), that is, the position of the user.

Figure 4:
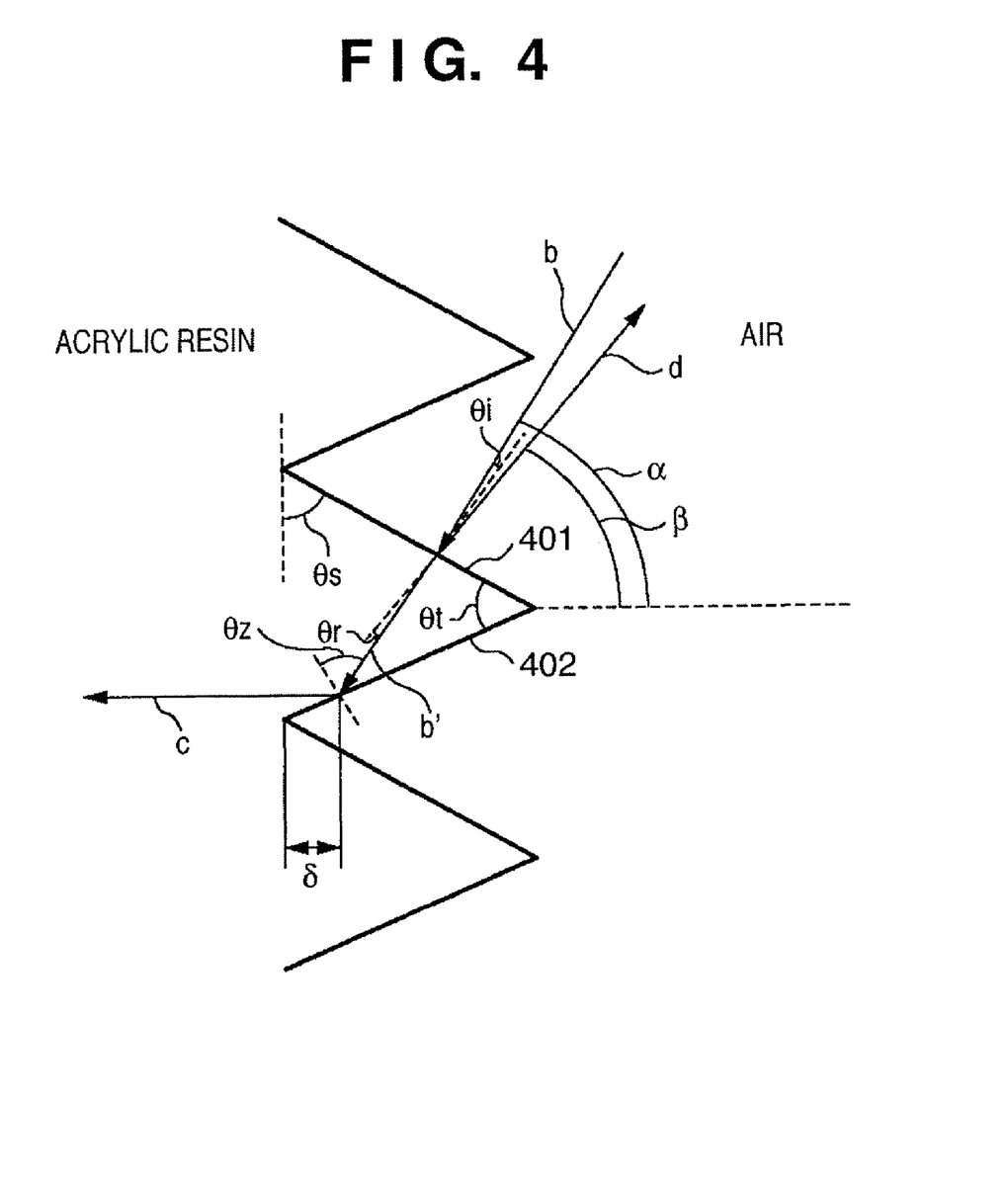
FIG. 4 is an enlarged view of part of a cross-section of a total reflection fresnel screen.

FIG. 4 is an enlarged view of part of a cross-section of the total reflection fresnel screen 102 when it is cut from its center in the radial direction. The surface of the screen 102 facing inward of the apparatus has a prism-like shape. Note that the left side of the cross-section of FIG. 4 indicates the screen 102 comprising acrylic resin or the like, and the right side of the cross-section indicates a space (air) inside the apparatus.

The vertex angle of the prism is determined to totally reflect the light b from the ceiling mirror 103 toward a direction c as the viewer direction. Letting θs be the angle defined between an incidence surface 401 of the prism and the screen surface, θt be the apex angle of the prism, and α be the incidence angle of the light b with respect to the screen surface, an incidence angle θi of the light b with respect to the prism surface (incidence surface) can be represented by $$\theta i = \alpha - \theta s \qquad (1)$$

In addition, letting n be the index of refraction of the material of the prism, an emergence angle θr of a light beam b' which is refracted by the incidence surface 401 and emerges is given by $$\mathrm{SIN}(\theta r) = \mathrm{SIN}(\theta i)/n \qquad (2)$$

Therefore, an incidence angle θz of the light beam b' with respect to a total reflecting surface 402 is given by $$\theta z = \theta t - \theta r \quad (3)$$

It is necessary to select θt to be equal to or more than a critical angle (42.16° when n=1.49) for total reflection. A condition for making the direction of a totally reflected exit light beam c be perpendicular to the screen surface is represented by $$\theta z = 180° - \theta t - \theta s \quad (4)$$

Therefore, equations (1), (2), and (3) are rearranged into $$\text{TAN } \theta s = (\text{SIN } \alpha + n \text{ SIN } 2\theta t)/(\text{COS } \alpha - n \text{ COS } 2\theta t) \quad (5)$$

That is, when acrylic resin (n=1.49) is used as a material for the prism (fresnel screen), and θt=58° and α=72.97°, θs=67.60° and θz=54.40°.

Since the above equation holds at an arbitrary position within a frame, θs and θz are obtained as follows with respect to the minimum and maximum values of α with n=1.49 and θt=58°. When αmin=65.22°, θs=64.49° and θz=57.51°. When αmax=78.19°, θs=69.69° and θz=52.31°.

Therefore, θs is gradually changed from 64.49° to 69.69° so as to match θs obtained by equation (5) with respect to α=65.22° to 78.19° while θt is kept constant. Forming a concentric prism group on the surface of the screen 102 so as to match the angles obtained in this manner can make the directions of exit light beams perpendicular to the screen throughout the entire frame range.

As described above, the incidence surface 401 of the prism produces a very small amount of reflected light beam d as well as the transmitted light beam b'. With regard to the amount of reflected light beam d, when the index of refraction of the prism is 1.49, the reflectance is about 4%. Assume that this light beam is reflected by the ceiling mirror 103 and returns to the direction of the screen 102. In this case, the user observes the light beam as a ghost on a display frame. For this reason, it is necessary to select a value for θt to prevent light from being reflected in the direction of the screen 102.

<Video Signal Processing>

Figure 5:
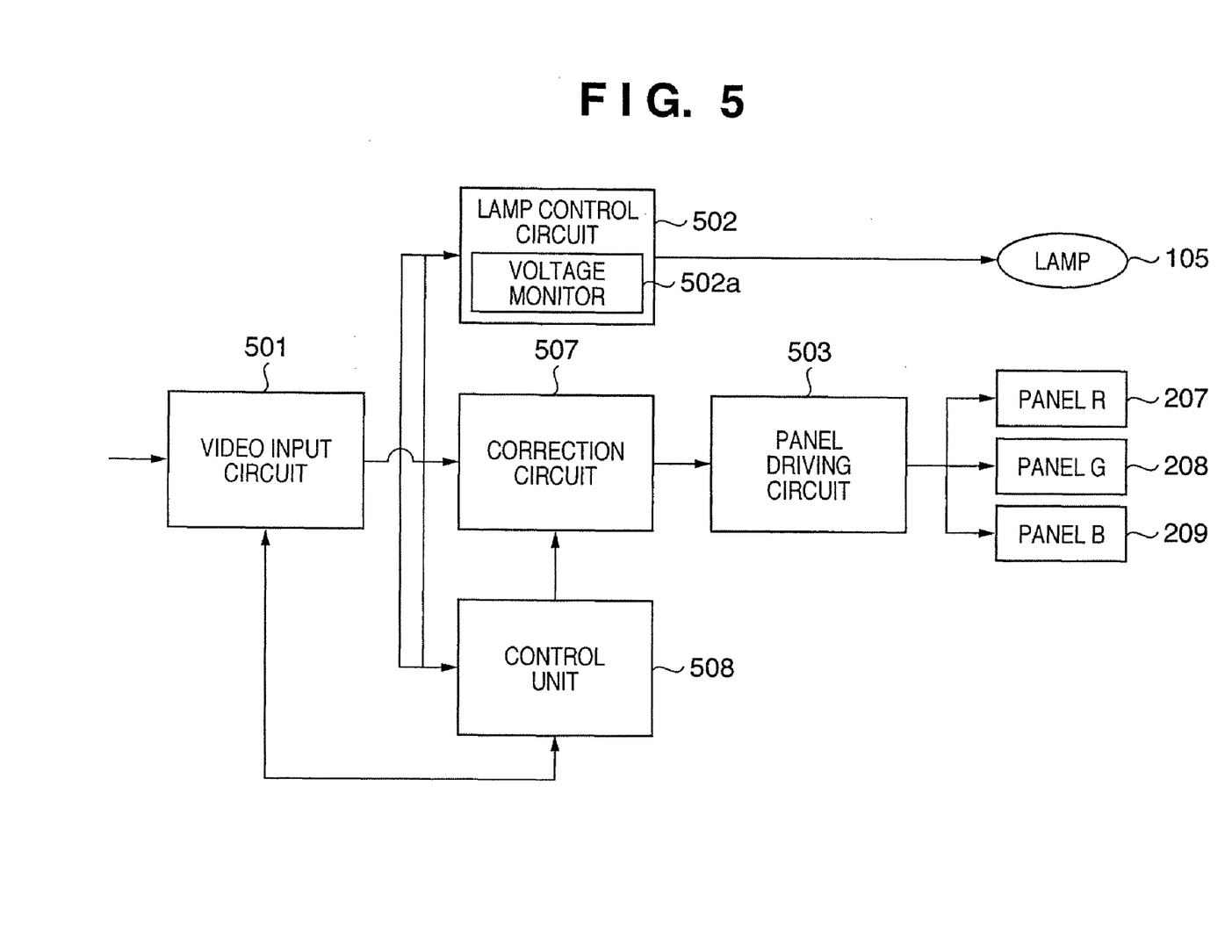
FIG. 5 is a block diagram showing a processing procedure for a video signal.

FIG. 5 is a block diagram showing a processing procedure for a video signal. This apparatus roughly comprises a video input circuit 501, lamp control circuit 502, panel driving circuit 503, correction circuit 507, and control unit 508. The lamp control circuit 502 includes a voltage monitor 502a which monitors an interelectrode voltage (to be referred to as a terminal voltage, hereinafter) of the discharge lamp 105.

The video input circuit 501 is a circuit which receives an external video signal, and performs various kinds of image processing, for example, resolution conversion, IP (Interlace-Progressive) conversion, and color processing.

The lamp control circuit 502 is a circuit for controlling the lighting of the discharge lamp 105. This circuit is called a ballast power supply or the like in the case of a superhigh-pressure mercury lamp. Note that when the apparatus uses an LED instead of the discharge lamp 105, this portion is an LED driving circuit.

The panel driving circuit 503 is a driving circuit for driving the LCOS panels 207 to 209 corresponding to the respective colors, that is, R, G, and B.

The correction circuit 507 corrects the gamma characteristic or the like of each video signal supplied to the panel driving circuit 503. For example, this circuit is configured to perform, for example, matrix operation determined by a designated correction amount (coefficient) for an input signal to obtain an output signal after the correction.

The control unit 508 controls the respective circuits described above. For example, a CPU executes the programs stored in a ROM to implement control. Of course, the control unit 508 may be formed by an ASIC.

<Temporal Change in State of Discharge Lamp at Time of Lighting>

A temporal change in the state of the discharge lamp 105 at the time of lighting will be described in detail below.

The control unit 508 starts lighting the discharge lamp 105 by transmitting a lighting start instruction signal to the lamp control circuit 502. The lamp control circuit 502 applies a high-voltage pulse of several kV to the discharge electrodes in the discharge lamp 105 in response to the lighting start instruction as a trigger. Although the discharge electrodes in the discharge lamp 105 are initially electrically isolated, electric breakdown occurs between them due to arc discharge caused by high-voltage pulse application.

In an initial period at the start of arc discharge upon high-voltage pulse application, mercury in the discharge lamp 105 adheres to electrode portions without evaporating. With the progress of discharge, however, the mercury gradually evaporates to increase the internal pressure with a rise in temperature. As the amount of mercury vapor increases, light emission starts, and the luminance increases. In addition, with an increase in internal pressure, the emission spectrum changes. That is, the white balance changes over time.

The terminal voltage of the discharge lamp 105 gradually increases with a rise in mercury pressure inside the lamp after electric breakdown, and converges to a given voltage value. In general, the lamp control circuit 502 of the discharge lamp 105 measures the voltage value of the terminal voltage by using the voltage monitor 502a to keep the amount of discharged light constant. That is, in order to keep the power consumed by the discharge lamp 105 constant, the lamp control circuit 502 controls a current quantity based on the voltage value acquired by the voltage monitor 502a (constant power driving). Note, however, that in an initial period at the start of arc discharge, the terminal voltage is low. In this state, supplying a large current will cause electrode breakdown. For this reason, the lamp control circuit 502 controls a current within a range in which the electrodes are free from influence with the terminal voltage being equal to or lower than a predetermined voltage. In this case, the lamp control circuit 502 performs control such that a current flowing in the electrodes to promote the evaporation of mercury adhering to the electrodes is kept constant (constant current driving). That is, the lamp control circuit 502 performs constant current driving until the internal pressure in the discharge lamp 105 rises and the voltage value exceeds a predetermined voltage, and performs constant power driving after the voltage value exceeds the predetermined voltage.

The terminal voltage of the discharge lamp 105 is determined by the distance between the electrodes and the pressure of the mercury vapor. Since the distance between the discharge electrodes can be regarded as constant in a short time span, it can be understood that the terminal voltage is mainly determined by the mercury vapor pressure inside the lamp.

The pressure of mercury vapor also influences emission spectrum characteristics of the discharge lamp 105. For example, lighting a superhigh-pressure mercury lamp or the like used in a projector at about 200 atm implements a short arc structure and gentle spectral characteristics. That is, this achieves spectral characteristics containing components ranging from a short wavelength (blue) to a long wavelength (red). For this reason, in a state wherein the pressure of mercury vapor is not sufficient immediately after lighting or the like, the spectral characteristics differ from the original spectral characteristics to cause color misregistration (white balance offset).

It can be understood from this that the terminal voltage of the discharge lamp 105 is made to correspond to the pressure of mercury vapor in the discharge lamp 105 in a short-time span in which the distance between the discharge electrodes can be regarded as constant. That is, a change in the terminal voltage of the discharge lamp 105 directly reflects a change in the emission luminance or color of the discharge lamp 105.

Figure 6:
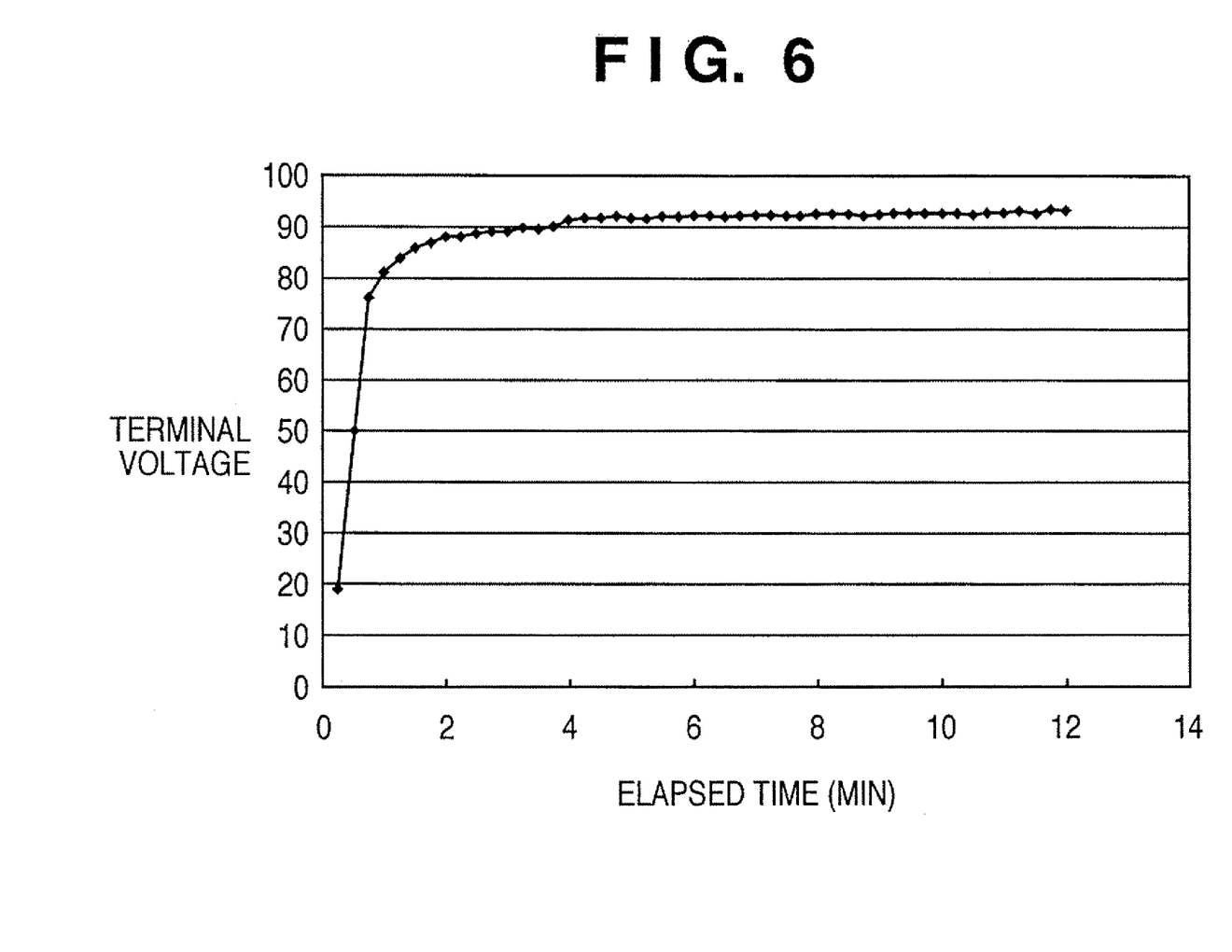
FIG. 6 is a graph showing an actual measurement example of a temporal change in a terminal voltage of a discharge lamp.
Figure 7:
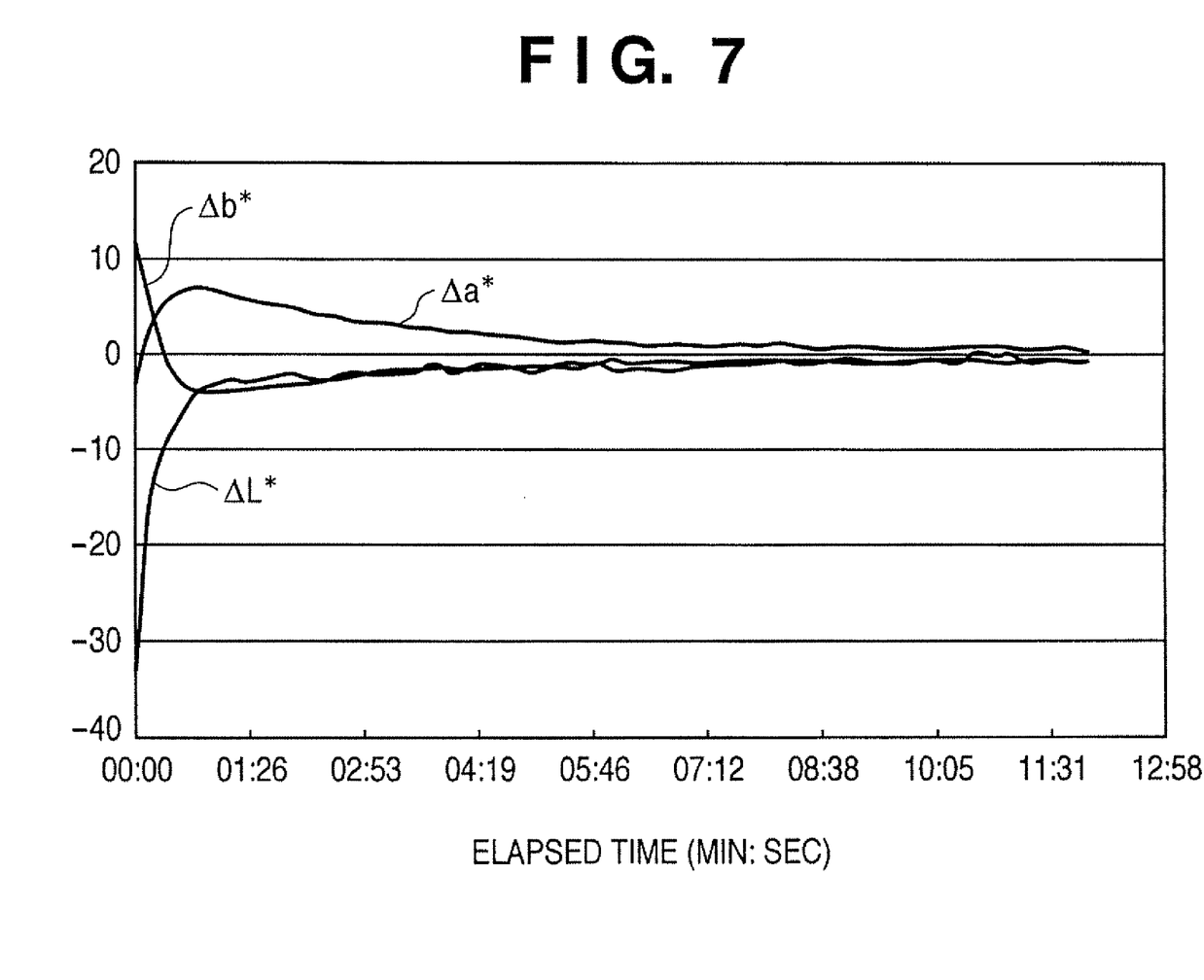
FIG. 7 is a graph showing an actual measurement example of a temporal change in emission color from the discharge lamp.

FIG. 6 is a graph showing an actual measurement example of a temporal change in the terminal voltage of the discharge lamp. Note that pulse voltage application for electric breakdown is the start point of measurement. FIG. 7 is a graph showing an actual measurement example of a temporal change in emission color from the discharge lamp 105 in the same period as that in FIG. 6. Referring to FIG. 7, differences $\Delta L^*$, $\Delta a^*$, and $\Delta b^*$ are derived with reference to component values $L^*$, $a^*$, and $b^*$ of light emitted from the discharge lamp in a stable state after long-time lighting and are plotted against the elapsed time. In this case, $L^*$, $a^*$, and $b^*$ represent lightness and chromaticity in the $L^*$, $a^*$, and $b^*$ color system as a color system standard. $L^*$ represents lightness, and $a^*$ and $b^*$ represent chromaticity (hue and chrominance).

Comparing a temporal change in the terminal voltage of the discharge lamp 105 (FIG. 6) with a temporal change in $\Delta L^*$, $\Delta a^*$, and $\Delta b^*$ of the discharge lamp 105 (FIG. 7) makes it possible to ascertain a good correlation with a change with respect to the elapsed time. This allows ascertaining, in particular, considerable similarity between the terminal voltage of the discharge lamp 105 and the luminance change ($\Delta L^*$). It is also obvious that the amount of change in color misregistration of $\Delta a^*$ and $\Delta b^*$ is similar to the amount of change in voltage.

This embodiment is therefore configured to correct color misregistration (white balance offset) corresponding to changes in $a^*$ and $b^*$ based on the detected value of the terminal voltage of the discharge lamp 105. As described above, since a display apparatus using a discharge lamp includes a voltage monitor for measuring a terminal voltage, the embodiment uses the voltage monitor. This makes it unnecessary to add any hardware such as a sensor, and hence this arrangement causes no increase in the cost of the display apparatus. Even if control is implemented by an analog circuit or the like, the arrangement can acquire data using an inexpensive A/D converter or the like.

In actual color correction, the control unit 508 is configured to acquire the voltage value of a terminal voltage from the lamp control circuit 502 and change, for example, the 3×3 correction coefficients of an RGB transformation matrix in the correction circuit 507. The lamp control circuit 502 sets in advance a correction value for the voltage value of a terminal voltage by using a lookup table (LUT) or the like. In this case, a correction value may be a value determined in advance with respect to a representative lamp characteristic or may be a correction value measured in each initial lamp period. The control unit 508 is then configured to sequentially change correction coefficients in the correction circuit 507 based on the voltage value of a terminal voltage and the LUT. That is, the control unit 508 corrects color misregistration by independently controlling the transmittances of the LCOS panels 207 to 209 corresponding to R, G, and B.

Using the RGB transformation matrix in the above manner makes it possible to perform correction by determining several transformation coefficients for correction and rewriting them and to reduce the amount of data and rewrite the data at high speed. It suffices to perform correction by using methods other than these methods. For example, it suffices to perform fine control by using a three-dimensional lookup table (3D-LUT) or use an arrangement for performing correction with respect to six axes. In addition, it suffices to implement this operation by directly rewriting the gamma tables for the LCOS panels 207 to 209.

Note that it suffices to perform correction for both color misregistration corresponding to changes in $a^*$ and $b^*$ and a change in luminance corresponding to $L^*$. Correcting a gamma curve for a dark portion can properly display a portion which is otherwise blackened.

<Operation Sequence for Correction Control>

Figure 8:
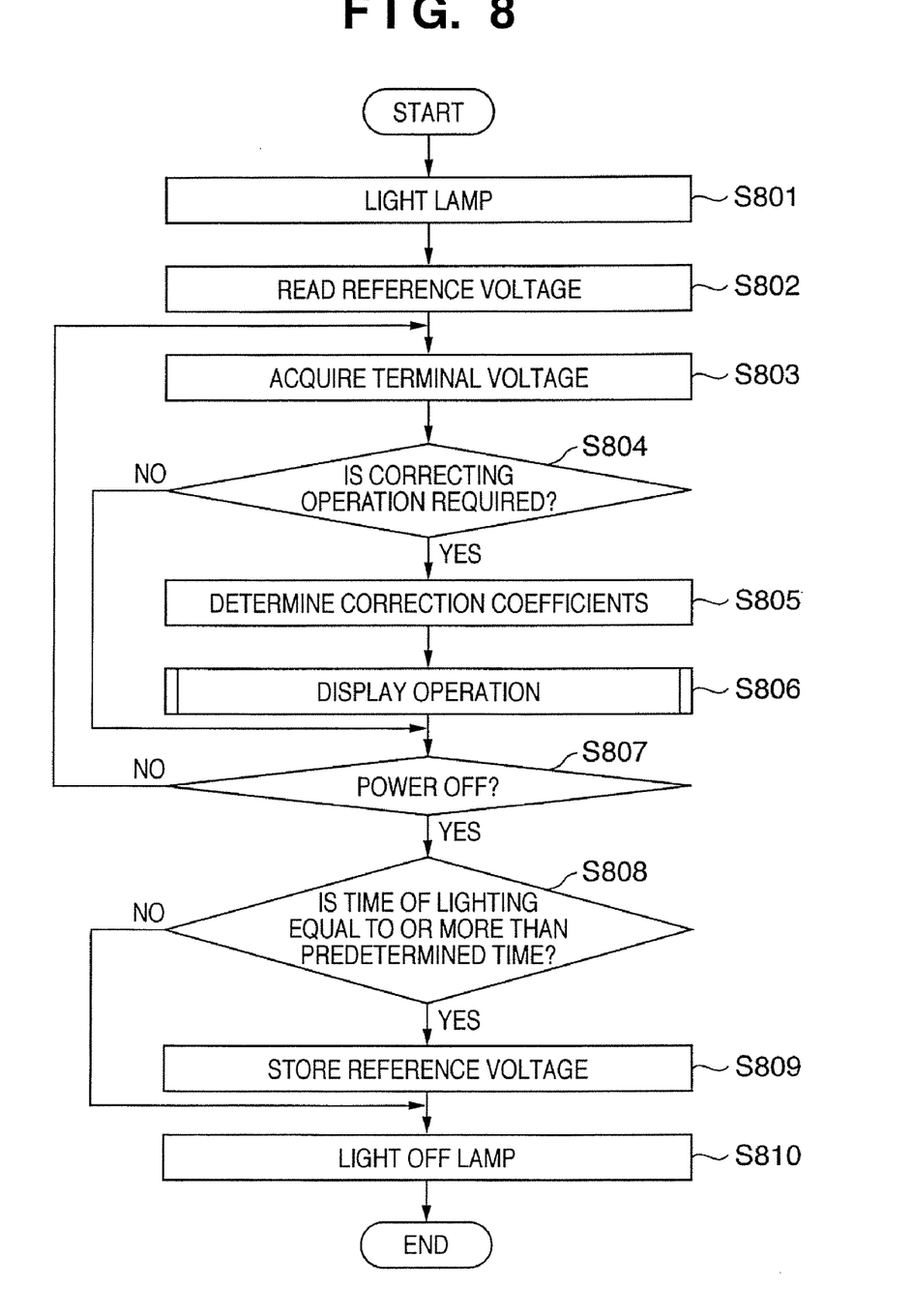
FIG. 8 is a flowchart showing operation to be performed when color misregistration is corrected.

FIG. 8 is a flowchart showing operation to be performed when color misregistration is corrected. The control unit 508 executes the following flowchart after the power supply of the display apparatus is turned on and a boot sequence for initialization of each circuit block and the like is executed. Assume that the display apparatus described in the following flowchart has a rewritable storage area formed by a flash memory in the control unit 508.

In step S801, the control unit 508 transmits a lighting start instruction signal to the lamp control circuit 502 to start lighting the discharge lamp 105. The control unit 508 may be configured to start a timer for measuring an elapsed time from the start of lighting of the discharge lamp 105.

In step S802, the control unit 508 reads out a reference voltage Vr from a flash memory. Note that the reference voltage Vr is the voltage value of a terminal voltage in a stable state which is stored at the end of previous operation of the display apparatus or the like (step S810 to be described later). It also suffices to store the reference voltage Vr at the time of shipment.

In step S803, the control unit 508 acquires a terminal voltage V1 of the discharge lamp 105 from the lamp control circuit 502. Note that the control unit 508 may also be configured to derive a ratio V1/Vr between the voltage value V1 and the reference voltage Vr acquired in step S802. Deriving and normalizing a ratio in this manner makes it possible to reduce the manufacture variations of the discharge lamp 105 and variations due to aging and the like.

In step S804, the control unit 508 determines to execute color correction control. For example, the control unit 508 is configured to determine to execute correcting operation if the terminal voltage acquired in step S803 is equal to or less than a predetermined voltage value, and to determine not to execute correcting operation if the terminal voltage is equal to or more than the voltage value. Note that the control unit 508 may be configured to determine not to execute correcting operation, by referring to a timer instead of the voltage value of a terminal voltage, if the time of lighting of the lamp exceeds a predetermined time. In addition, the control unit 508 may be configured to receive a designation indicating whether to execute correction from the user by providing a user interface for the display apparatus. If the control unit 508 determines to execute correcting operation, the process advances to step S805. If the control unit 508 determines not to execute correction, the process advances to step S807.

In step S805, the control unit 508 determines color matrix coefficients by referring to a preset lookup table (LUT) based on the voltage value of a terminal voltage derived in step S803 (a normalized voltage value). For example, an LUT is a table in which 3×3 coefficients for performing correction computation for the three colors, i.e., R, G, and G, are associated with voltage values in the LUT. It suffices to properly determine the resolution width of a voltage in accordance with the interval required by the display apparatus. The control unit 508 sets the determined correction coefficients as parameters in the correction circuit 507.

In step S806, the control unit 508 performs display operation by controlling the correction circuit 507 which operates with the correction coefficients set in step S805. That is, the correction circuit 507 receives a video signal input through the video input circuit 501, and drives the panel driving circuit.

In step S807, the control unit 508 determines whether the power OFF of the display apparatus is designated. If the control unit 508 determines that the power OFF is designated, the process advances to step S808. If the control unit 508 determines that the power OFF is not designated, the process returns to step S803 after the lapse of a predetermined period of time. In this case, the predetermined period of time may be determined based on the time-varying rate of a terminal voltage. That is, the predetermined period of time is properly determined to change correction coefficients with a frequency which allows for follow up of a change in terminal voltage.

In step S808, the control unit 508 derives a duration time of lighting of the discharge lamp 105 by referring to the timer. The control unit 508 then determines whether the duration time of lighting is longer than a predetermined period of time. In this case, the predetermined period of time is the time required for the discharge lamp 105 to reach a stable state. Upon determining that the duration time of lighting is longer, the control unit 508 finally stores the terminal voltage value acquired in step S803 as the reference voltage Vr in the flash memory (S809). Upon determining that the predetermined period of time is shorter, the process advances to step S810, in which the control unit 508 transmits a lighting-off instruction signal to the lamp control circuit 502 to light off the discharge lamp 105. Note that the control unit 508 performs a shutdown sequence such as cooling the lamp after lighting off. Properly updating the reference voltage Vr for each operation of the display apparatus in this manner makes it possible to cancel variations among discharge lamp products and a change in voltage due to aging. In addition, the lifetime (life expectancy) of the discharge lamp can be estimated as described in detail in the second embodiment.

Note that the determination method in step S808 may be performed based on, for example, the rate of change of a terminal voltage as well as based on the timer. That is, if a change in terminal voltage is sufficiently small (e.g., smaller than a detection limit), it may be determined that the discharge lamp 105 has reached a stable state. It also suffices to add correction in accordance with the ambient temperature.

In this embodiment, the display apparatus has been described as a rear projection type display apparatus. However, the embodiment can be applied to a front projection type display apparatus. In addition, it suffices to measure a current value instead of a voltage value and perform control based on the current value.

In addition, similar correcting operation can be applied to a display apparatus using an LED based on a VF value (forward voltage value), although a voltage change occurs in a different form.

As described above, the first embodiment can provide a high-image-quality display apparatus which can perform proper correction with respect to an abrupt change in luminance at the time of lighting of a discharge lamp and a white balance change.

Second Embodiment

The first embodiment has exemplified the method of correcting color misregistration and a luminance change in a relatively short period at the start of lighting of the discharge lamp. Note that the terminal voltage of the discharge lamp depends not only on the pressure of mercury vapor in the discharge lamp but also on the distance between the electrodes. Since it is known that the distance between the electrodes has good correlation with the accumulated time of lighting of the discharge lamp, the lifetime (life expectancy) of the discharge lamp can be estimated based on the voltage value of the terminal voltage.

That is, comparing the voltage value of the terminal voltage of a discharge lamp 105 in a stable state with the voltage value stored in advance at the time of shipment or the initial voltage value at the time of replacement of the lamp makes it possible to estimate the lifetime of the discharge lamp based on the difference.

Figure 9:
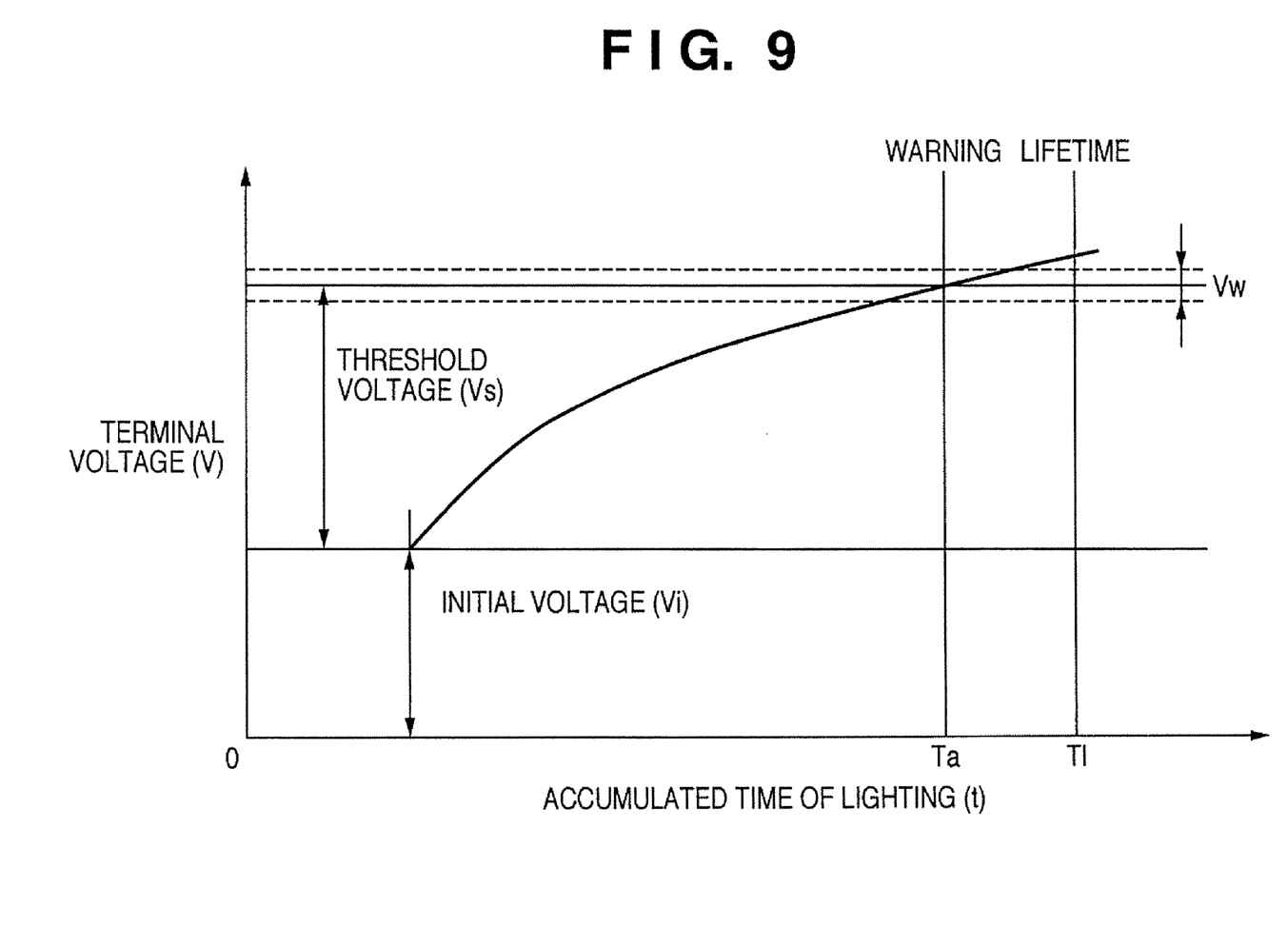
FIG. 9 is a graph schematically showing a change in the terminal voltage of the discharge lamp with respect to the accumulated time of lighting.

FIG. 9 is a graph schematically showing a change in the terminal voltage of the discharge lamp with respect to the accumulated time of lighting.

At the time of replacement of a discharge lamp, an initial voltage (Vi) in the initial stable state is stored in advance in step S809. At the time of the second or subsequent operation of the display apparatus, the voltage value of the terminal voltage in the current stable state is compared with the initial voltage (Vi). At the time (Ta) when the difference exceeds a predetermined threshold voltage (Vs), it is determined that the lifetime (T1) of the discharge lamp will soon come to an end, and the user is notified of this information by producing an alarm sound or displaying a window. Note that a threshold voltage (Vs) is set in advance depending on the type of discharge lamp to be used.

Note that if a threshold (Vs) with a certain margin is set for the lifetime (T1) of a discharge lamp, no practical problem arises in the above arrangement without any change. However, the equilibrium point of the pressure of mercury vapor is influenced by an ambient temperature (environmental temperature), and the voltage value of the terminal voltage changes. For this reason, in order to estimate the lifetime of the discharge lamp more stably, the apparatus may be configured to provide a predetermined correction width (Vw) for the threshold (Vs). In this case, if an environmental temperature is higher than an environmental temperature at the time of measurement of an initial voltage (Vi), a relatively high threshold is set, and vice versa.

An electrode material or the like adheres to the inner surface of the glass of the discharge lamp (a blackening phenomenon) in accordance with the accumulated time of lighting of the discharge lamp. The luminance of the discharge lamp changes due to the blackening phenomenon. Therefore, this apparatus may be configured to perform luminance compensation with respect to the blackening phenomenon based on a change in terminal voltage.

As described above, the second embodiment can notify the user of the end of the lifetime of the discharge lamp based on a change in terminal voltage corresponding to the accumulated time of lighting of the discharge lamp. In addition, the second embodiment can provide a high-image-quality display apparatus which can perform proper correction with respect to a change in luminance due to the blackening phenomenon of a discharge lamp.

Other Embodiment

Although an embodiment has been described in detail above, the present invention can be applied to a system comprising a plurality of devices, or to an apparatus comprising a single device.

The present invention can be implemented by directly or remotely supplying programs for implementing the functions of the embodiment described above to a system or apparatus and causing the computer of the system or apparatus to read out and execute the programs. Therefore, the technical range of the present invention incorporates the program codes themselves which are installed in a computer to allow the computer to implement the functions/processing of the present invention.

In this case, each program may take any form, for example, an object code, a program executed by an interpreter, and script data supplied to an OS, as long as it has the function of the program.

As a recording medium for supplying the programs, a floppy (registered trademark) disk, hard disk, optical disk (CD or DVD), magnetooptical disk, magnetic tape, nonvolatile memory card, ROM, or the like can be used.

In addition, methods of supplying the programs include the following. A client computer connects to a homepage on the Internet by using a browser to download each computer program of the present invention itself from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a homepage through the Internet, executing the encrypted programs using the key information, and allowing a computer to install the programs.

The functions of the above embodiment are implemented not only when the readout programs are executed by the computer but also when the OS running on the computer performs part or all of actual processing based on the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-118443, filed Apr. 21, 2006, which is hereby incorporated by reference herein in its entirety.

What is claimed is:

1. A projection type display apparatus which projects irradiating light from a light source unit to a screen through a light valve, comprising:
   a measurement unit adapted to measure a voltage value supplied to the light source unit;
   a determination unit adapted to determine whether to control the light valve by comparing the measured voltage value with a predetermined voltage value; and
   a control unit adapted to control the light valve on the basis of a determination result obtained by said determination unit,
   wherein the control unit derives a duration time of lighting the light source unit, and sets the measured voltage value as the predetermined voltage value when the derived duration time exceeds a predetermined period of time.

2. The apparatus according to claim 1, wherein said control unit controls the light valve on the basis of a relationship between an irradiated intensity and the measured voltage value.

3. The apparatus according to claim 1, wherein
   the light valve comprises a light valve group corresponding to light beams of three colors R, G, and B, and
   said control unit independently controls the respective light valves constituting the light valve group.

4. The apparatus according to claim 3, wherein said control unit corrects white balance by controlling the light valve group on the basis of a relationship between an irradiated spectrum and the measured voltage value.

5. The apparatus according to claim 1, wherein the light source unit comprises a discharge lamp.

6. The apparatus according to claim 1, further comprising:
   a storage control unit adapted to store the predetermined voltage value in a steady state in a memory; and
   a notification unit adapted to notify a user on the basis of a result of comparison between a measurement result obtained by said measurement unit and the predetermined voltage value stored in said storage unit.

7. A control method for a projection type display apparatus which projects irradiating light from a light source unit to a screen through a light valve, comprising:
   a measurement step of measuring a voltage value supplied to the light source unit;
   a determination step of determining whether to control the light valve by comparing the measured voltage value with a predetermined voltage value; and
   a control step of controlling the light valve on the basis of a determination result obtained in the determination step,
   wherein the control step includes deriving a duration time of lighting the light source unit, and setting the measured voltage value as the predetermined voltage value when the derived duration time exceeds a predetermined period of time.

8. A non-transitory computer-readable medium storing thereon a computer-executable control program for a projection type display apparatus which projects irradiating light from a light source unit to a screen through a light valve, the program comprising:
   a program code for executing a measurement step of measuring a voltage value supplied to the light source unit;
   a program code for executing a determination step of determining whether to control the light valve by comparing the measured voltage value with a predetermined voltage value; and
   a program code for executing a control step of controlling the light valve on the basis of a determination result obtained in the determination step,
   wherein the program code for executing the control step includes program code for deriving a duration time of lighting the light source unit, and program code for setting the measured voltage value as the predetermined voltage value when the derived duration time exceeds a predetermined period of time.

* * * * *